US012407267B2

(12) United States Patent
Liu (10) Patent No.: US 12,407,267 B2
(45) Date of Patent: Sep. 2, 2025

(54) SWITCHING POWER SUPPLY SYSTEM WITH BOTH ANALOG AND DIGITAL FEEDBACK

(71) Applicant: MIX-DESIGN SEMICONDUCTOR TECHNOLOGIES LTD., Jiangsu (CN)

(72) Inventor: Wanle Liu, Jiangsu (CN)

(73) Assignee: MIX-DESIGN SEMICONDUCTOR TECHNOLOGIES LTD., Jiangsu (CN)

( * ) Notice: Subject to any disclaimer, the term of this patent is extended or adjusted under 35 U.S.C. 154(b) by 139 days.

(21) Appl. No.: 18/406,391

(22) Filed: Jan. 8, 2024

(65) Prior Publication Data
US 2024/0333122 A1    Oct. 3, 2024

(30) Foreign Application Priority Data

Apr. 1, 2023 (CN) .......................... 202310338982.4

(51) Int. Cl.
*H02M 3/335* (2006.01)
*H02M 1/00* (2006.01)
*H02M 1/092* (2006.01)

(52) U.S. Cl.
CPC ..... *H02M 3/33592* (2013.01); *H02M 1/0003* (2021.05); *H02M 1/092* (2013.01); *H02M 3/33515* (2013.01); *H02M 3/33523* (2013.01); *H02M 3/33576* (2013.01); *H02M 1/0025* (2021.05)

(58) Field of Classification Search
CPC ........... H02M 3/33592; H02M 1/0003; H02M 1/092; H02M 3/33515; H02M 3/33523; H02M 3/33576; H02M 1/0025; H02M 1/0012; H02M 1/08; Y02B 70/10; H03M 1/66
See application file for complete search history.

(56) References Cited

U.S. PATENT DOCUMENTS

| | | | | |
|---|---|---|---|---|
| 7,239,532 | B1 * | 7/2007 | Hsu ................... | H02M 3/33523 363/21.16 |
| 10,116,222 | B2 * | 10/2018 | Cohen ............... | H02M 3/33592 |
| 2006/0083029 | A1 * | 4/2006 | Yoshida ............ | H02M 3/33592 363/6 |
| 2008/0025450 | A1 * | 1/2008 | Alfano .............. | H02M 3/33523 375/362 |
| 2009/0212759 | A1 * | 8/2009 | Melanson ............... | H02M 3/41 341/143 |
| 2010/0208500 | A1 * | 8/2010 | Yan ................... | H02M 3/33523 363/21.12 |

(Continued)

*Primary Examiner* — Yusef A Ahmed
(74) *Attorney, Agent, or Firm* — Cooper Legal Group, LLC (57) ABSTRACT

The present application discloses a switching power supply system with both analog and digital feedback, the steps for regulating an output voltage of the switching power supply system are as follows: indirectly obtaining the system output voltage on a primary side of the switch power supply, and regulating the output voltage for a first time by controlling a primary switch tuber; directly obtaining an actual output voltage of the system on a secondary side of the switching power supply, obtaining a voltage difference between the actual output voltage of the system and a load demand voltage, and regulating the output voltage secondary according to the voltage difference.

9 Claims, 3 Drawing Sheets

(56) References Cited

U.S. PATENT DOCUMENTS

| | | | | |
|---|---|---|---|---|
| 2011/0044076 A1* | 2/2011 | Zhang | H02M 3/33507 | 363/21.17 |
| 2011/0222318 A1* | 9/2011 | Uno | H02M 3/33523 | 363/21.04 |
| 2013/0003421 A1* | 1/2013 | Fang | H02M 3/33523 | 363/21.01 |
| 2013/0223107 A1* | 8/2013 | Zhang | H02M 3/33523 | 363/21.16 |
| 2013/0264961 A1* | 10/2013 | Chang | H04B 10/802 | 315/201 |
| 2013/0272035 A1* | 10/2013 | Strzalkowski | H02M 3/33546 | 363/21.01 |
| 2014/0078790 A1* | 3/2014 | Lin | H02M 3/33507 | 363/21.16 |
| 2014/0160810 A1* | 6/2014 | Zheng | H02M 3/33576 | 363/21.17 |
| 2014/0268901 A1* | 9/2014 | Telefus | H02M 3/33576 | 363/21.01 |
| 2015/0188442 A1* | 7/2015 | Kesterson | H02M 3/33523 | 363/21.15 |
| 2016/0352237 A1* | 12/2016 | Quigley | H02M 1/08 | |
| 2016/0373011 A1* | 12/2016 | Kawashima | H02M 1/32 | |
| 2016/0373014 A1* | 12/2016 | Pflaum | H02M 3/33523 | |
| 2017/0070156 A1* | 3/2017 | Chapman | H02M 1/14 | |
| 2017/0338746 A1* | 11/2017 | Chen | H02M 3/33592 | |
| 2018/0054128 A1* | 2/2018 | Li | H02M 3/33507 | |
| 2018/0205319 A1* | 7/2018 | Zhuo | H02M 3/33523 | |
| 2018/0248490 A1* | 8/2018 | Lin | H02M 3/28 | |
| 2019/0089264 A1* | 3/2019 | Hirose | H02M 3/285 | |
| 2019/0252985 A1* | 8/2019 | Radic | H02M 3/33515 | |
| 2019/0341852 A1* | 11/2019 | Fahlenkamp | H02M 3/33515 | |
| 2019/0356231 A1* | 11/2019 | Radic | H02M 3/33523 | |
| 2020/0212811 A1* | 7/2020 | Lin | H02M 3/33507 | |
| 2020/0287454 A1* | 9/2020 | Lee | H02M 3/156 | |
| 2021/0111630 A1* | 4/2021 | Zhao | H02M 1/36 | |
| 2021/0257922 A1* | 8/2021 | Bessegato | H02M 3/33523 | |
| 2021/0408926 A1* | 12/2021 | Feng | H02M 1/08 | |
| 2022/0368238 A1* | 11/2022 | Liu | H02M 3/33573 | |
| 2024/0280645 A1* | 8/2024 | Khamesra | H02M 1/32 | |
| 2024/0333165 A1* | 10/2024 | Liu | H02M 1/08 | |
| 2024/0421688 A1* | 12/2024 | Shen | H02M 1/0058 | |
| 2025/0007412 A1* | 1/2025 | Shen | H02M 1/44 | |

\* cited by examiner

SWITCHING POWER SUPPLY SYSTEM WITH BOTH ANALOG AND DIGITAL FEEDBACK

CROSS-REFERENCE TO RELATED APPLICATION

The present application is based on and claims the priority benefits of China application No. 202310338982.4, filed on Apr. 1, 2023. The entirety of China application No. 202310338982.4 is hereby incorporated by reference herein and made a part of this specification.

TECHNICAL FIELD

The present application relates to a technical field of a circuit control technology, and in particular, relates to a switching power supply system with both analog and digital feedback.

BACKGROUND ART

A primary feedback method of a switching power supply is to indirectly sense a load demand voltage through a voltage on a primary auxiliary winding, and then control an on/off time of a switching tube through a primary control chip to realize a regulation of an output voltage and an output current; although the primary feedback has advantages of a simple structure and a low cost, however, due to a fact that the primary feedback of a switching power supply system is to sample the voltage on the primary auxiliary winding, which serves as an indirect representation of the output voltage or the output current, a sampling accuracy is low, and there are large control errors in different working conditions, at the same time, it greatly affects a transient response speed of a system output, generally, in a high demand usage environment, features of poor output characteristics of the primary feedback are difficult to meet the requirements, thereby, it can only be used in small-power, low requirements for application scenarios of dynamic response and control accuracy.

A secondary feedback method of the switching power supply is to directly detect the output voltage and the output current of the system at a secondary output end of the switching power supply, after an error amplification processing through a feedback network of the current and voltage, a simulated feedback quantity is generated, and then transmitting to a feedback receiving pin of a transformer primary side IC through a transmission media such as optocouplers between the primary and secondary, a primary control IC regulates the on/off time of the switching tube according to a feedback signal to realize a control of the output voltage and the output current; although the secondary feedback has the advantages of a high accuracy and a good dynamic response, however, due to its complex feedback network structure, there are high requirements for phase margin and gain size of the feedback signals in different output states, at the same time, specialized instruments are required to detect the phase margin and gain size, once parameters of the feedback network are set inappropriately, it will seriously affect a reliability of product performance, current fast charging systems all have a wide range of multiple rated current and voltage output gears, each voltage and current gear needs to meet safe phase margin and gain size, and parameter settings of the feedback phase margin and gain size between each gear will affect each other, therefore, relative to a traditional single output gear power supply system, reliability issues are prone to generate, thereby requiring a high debugging time cost and R&D labor cost, lengthening a system development cycle. At the same time, an increase in a number of components brought by a complex system feedback control network is not conducive to a development trend of lightweight and short product design.

In addition, in the feedback system, there are two methods: a digital feedback and an analog feedback, the digital feedback has a simple circuit structure, a high control accuracy, and no parameter setting issues such as the phase margin and gain size in the analog feedback, however, it has a disadvantage of a slow feedback speed; the analog feedback has the advantage of fast feedback or response speed, but it has disadvantages such as a complex system structure, a large number of components, the complex feedback parameter settings, and a poor anti-interference ability.

SUMMARY

In order to improve an adjustment accuracy of an output information of a switching power supply, reduce a complexity of a product circuit structure, and reduce a system development cycle, the present application provides a switching power supply system with both analog and digital feedback, the system has advantages of a simple primary feedback circuit structure, as well as the advantages of a high accuracy and a fast response speed of a secondary feedback, at the same time, the present application combines a relevant advantage of the analog feedback and the digital feedback, establishes a brand new power feedback control system with high accuracy, high reliability, fast response, and simple circuit structure, which is more suitable for future product design needs and development directions.

In a first aspect, the present application provides a switching power supply system with both analog and digital feedback, adopting the following technical solution:

the switching power supply system is configured to regulate an output voltage, wherein the switching power supply system comprises: a first primary analog feedback signal sampling and processing module, a first PFM/PWM control signal generating and driving module, a first secondary digital feedback signal sampling and driving module, a first isolation transmission module, and a first secondary digital feedback signal decoding and reference generating module;

the first primary analog feedback signal sampling and processing module is configured to sample a feedback voltage of an auxiliary winding on the primary side, and generate a corresponding feedback signal after processing a current feedback voltage, the feedback signal is output to the first PFM/PWM control signal generating and driving module;

the first PFM/PWM control signal generating and driving module is configured to control an on/off time of a primary switch tube according to the feedback signal, regulate an output voltage $V_{out}$ of a system output end, and make the output voltage $V_{out}$ value approach a demand voltage $V_{req}$ value of a load;

the first secondary digital feedback signal sampling and driving module is configured to directly obtain an actual output voltage of the system on a secondary side, and generate a secondary digital feedback signal after processing the actual output voltage of a current system, a secondary digital feedback signal is transmitted to the first secondary digital feedback signal decoding and reference generating module through the first isolation transmission module;

the first secondary digital feedback signal decoding and reference generating module is configured to generate a corresponding voltage reference signal according to a received secondary digital feedback signal, and output the voltage reference signal to the first PFM/PWM control signal generating and driving module;

the first PFM/PWM control signal generating and driving module is further configured to control the on/off time of the primary switch tube according to the voltage reference signal, and further regulate the output voltage $V_{out}$ of the system output end.

By adopting the above technical solution, the system output voltage is indirectly sampled on the primary side, by controlling the on/off time of the primary switch tube, adjusting the output voltage for a first time to make the output voltage approach the load demand voltage; directly obtaining the actual output voltage of the system on the secondary side of the switching power supply system, the voltage difference between the actual output voltage of the system and the load demand voltage is obtained, according to the voltage difference, the output voltage is regulated twice, improving a precision of the switching power supply system in regulating the output voltage and eliminating the impact of errors in related devices in the system loop on the output voltage, significantly improving the consistency of the system output.

In a second aspect, the present application further provides a switching power supply system with both analog and digital feedback, adopting the following technical solution:

the switching power supply system is configured to regulate an output current, wherein the switching power supply system comprises: a second analog collecting and regulating module, a second secondary digital feedback signal sampling and driving module, a second isolation transmission module, a second secondary digital feedback signal decoding and reference generating module;

the second analog collecting and regulating module is configured to collect a peak current on the primary side, determine an output current $I_{out}$ of the system according to the peak current, control the on/off time of the primary switch tube according to the output current $I_{out}$, regulate the output current $I_{out}$ of the system output end and make the output current $I_{out}$ value approach a preset maximum current $I_{max}$ value;

the second secondary digital feedback signal sampling and driving module is configured to directly obtain the system output current signal on the secondary side, and generate a secondary digital feedback signal after processing according to the output current signal and the preset maximum current $I_{max}$, the secondary digital feedback signal is transmitted to the second secondary digital feedback signal decoding and reference generating module through the second isolation transmission module;

the second secondary digital feedback signal decoding and reference generating module is configured to generate the corresponding current reference signal according to the received secondary digital feedback signal, and output the current reference signal to the second analog collecting and regulating module;

the second analog collecting and regulating module is further configured to update the preset reference current according to the current reference signal, control the on/off time of the primary switch tube according to the updated reference current, and further regulate the output current $I_{out}$ of the system output end;

the preset reference current value is equal to the preset maximum current $I_{max}$ value.

By adopting the above technical solution, the system output current is indirectly obtained on the primary side, by controlling the on/off time of the primary switch tube, regulating the output current for the first time to make the output current approach the preset maximum current; directly obtaining the actual output current signal of the system on the secondary side of the switching power supply, the current difference between the current output current of the system and the preset maximum current is obtained, according to the current difference, the output current is regulated twice, improving a precision of the switching power supply system in regulating the output current and eliminating the impact of errors in related devices in the system loop on the output current, significantly improving the consistency of the system output.

DETAILED DESCRIPTION

In order to make a purpose, technical solution, and advantages of the present application more clearly, embodiments of the present application is further described in detail below in combination with accompanying drawings.

Figure 1:
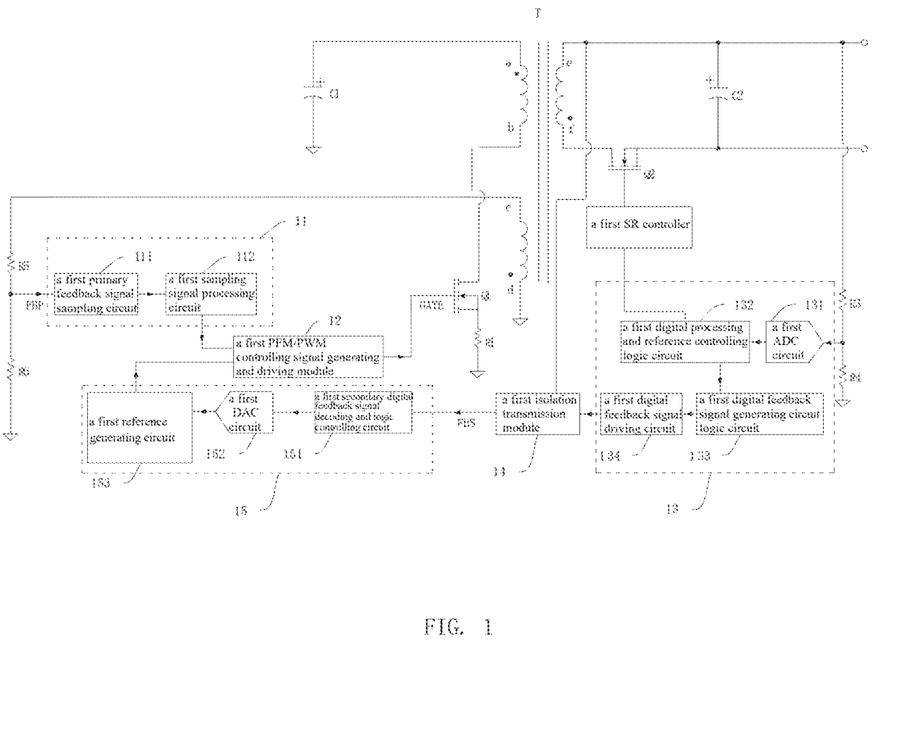
FIG. 1 is a circuit diagram of an output voltage regulation of switching power supply system in embodiment 1 according to the present application.

Embodiment 1: referring to FIG. 1, it is a circuit diagram for regulating an output voltage of a switching power supply system in the embodiment, a transmission method of a digital feedback signal of the embodiment is to transmit the feedback signal from a secondary side of the switching power supply system to a primary side of the switching power supply system through a first isolation transmission module 14.

The switching power supply system of the embodiment includes a transformer T, with one side of the transformer T port a, port b, port c, and port d being a primary side of the transformer, that is the primary side of the switching power supply system, one side of the transformer T port e and port f is a secondary side of the transformer, that is the secondary side of the switching power supply system, the port a is connected to a capacitance C1, a positive electrode of the capacitance C1 is connected to the port a, and a negative electrode of the capacitance C1 is grounded, the capacitance C1 is configured to filter a power supply of an input system; there is a capacitance C2 connected between a port e and a port f of the transformer T, a positive electrode of capacitance C2 is connected to the port e, the negative electrode of the capacitance C2 is connected to the port f, and capacitance C2 is configured to filter a voltage output from the system to a load.

The switching power supply system of the embodiment includes a first primary analog feedback signal sampling and processing module 11, a first PFM/PWM control signal generating and driving module 12, a first secondary digital feedback signal sampling and driving module 13, the first isolation transmission module 14, and a first secondary digital feedback signal decoding and reference generating module 15.

Furthermore, the first primary analog feedback signal sampling and processing module 11 includes a first primary feedback signal sampling circuit 111 and a first sampling signal processing circuit 112, the port c of the transformer T is connected in series with a resistance R5 and a resistance R6 in sequence and then grounded, the first primary feedback signal sampling circuit 111 is connected to an ungrounded end of the resistance R6.

In the embodiment, the primary switch tube is MOS tube Q1, a drain electrode of the MOS tube Q1 is connected to the port b of the transformer T, a source electrode of the MOS tube Q1 is connected in series with a resistance R1 and then grounded, a gate of the MOS tube Q1 is connected to the first PFM/PWM control signal generating and driving module 12.

The first secondary digital feedback signal sampling and driving module 13 includes a first ADC circuit 131, a first digital processing and reference controlling logic circuit 132, a first digital feedback signal generating circuit 133, and a first digital feedback signal driving circuit 134, the port e of the transformer T is connected in series with a resistance R3 and a resistance R4 and then grounded, the first ADC circuit 131 is connected to an ungrounded end of the resistance R4, a synchronous rectification MOS tube Q2 is electrically coupled between a secondary winding of the transformer T and the load, a drain electrode of the synchronous rectification MOS tube Q2 is connected to the port f of the transformer T, and a source electrode of the synchronous rectification MOS tube Q2 is connected to the load.

The first isolation transmission module 14 can adopt an optocoupler, a magnetic coupler, or other digital isolators, the first isolation transmission module 14 is connected to the port e of the transformer T.

The first secondary digital feedback signal decoding and reference generating module 15 includes a first secondary digital feedback signal decoding and logic controlling circuit 151, a first DAC circuit 152, and a first reference generating circuit 153.

Combining with FIG. 1, the following is a detailed description of how the switching power supply system in the embodiment can regulate the output voltage with a high accuracy:

S101: the first primary feedback signal sampling circuit 111 samples a feedback voltage of an auxiliary winding on a primary side and outputs the feedback voltage to the first sampling signal processing circuit 112.

S102: the first sampling signal processing circuit 112 generates a corresponding feedback signal after processing a current feedback voltage, and outputs the feedback signal to the first PFM/PWM control signal generating and driving module 12.

S103: the first PFM/PWM control signal generating and driving module 12 amplifies and processes an error between the feedback signal and a preset reference voltage to obtain a feedback error signal, and generates a PFM/PWM control signal according to the feedback error signal to control an on/off time of the primary switch tube, to regulate the output voltage $V_{out}$ of an output end of the system, so that the output voltage $V_{out}$ value approaches a demand voltage $V_{req}$ value of the load.

Optionally, a preset reference voltage value in the first PFM/PWM control signal generating and driving module 12 is equal to the demand voltage $V_{req}$ of the load.

The first PFM/PWM control signal mentioned above and the PFM/PWM control signal generated by a driving circuit 122 can be a pulse-width modulation signal and a pulse frequency modulation signal.

Through the above steps S101 to S103, an primary regulation of the output voltage $V_{out}$ was achieved. However, due to the fact that the above steps indirectly obtain the output voltage value of the secondary side by sampling the auxiliary winding on the primary side of the switching power supply system, thereby the sampling accuracy is low and there may be significant errors, resulting in a difference between an actual output voltage of the system after a primary regulation and the voltage required by the load. Therefore, regulating again through the following steps:

S104: the first ADC circuit 131 directly obtains the actual output voltage of the secondary side of the system, and converts the current actual output voltage of the system into a corresponding digital signal and then output it to the first digital processing and reference controlling logic circuit 132.

S105: the first digital processing and reference controlling logic circuit 132 obtains the actual output voltage of the current system according to the digital signal, compares the actual output voltage of the current system with the required voltage $V_{req}$ of the load, and obtains a voltage difference $\Delta V$ after processing, the voltage difference $\Delta V$ is output to the first digital feedback signal generating circuit 133.

S106: the first digital feedback signal generating circuit 133 generates the digital feedback signal according to the voltage difference $\Delta V$, and outputs the digital feedback signal to the first digital feedback signal driving circuit 134.

S107: the first digital feedback signal driving circuit 134 drives the first isolation transmission module 14 according to the digital feedback signal, and transmits the digital feedback signal to the first secondary digital feedback signal decoding and logic controlling circuit 151.

S108: the first secondary digital feedback signal decoding and logic controlling circuit 151 receives the digital feedback signal transmitted by the first isolation transmission module 14, decodes the digital feedback signal, and outputs the decoded digital feedback signal to the first DAC circuit 152.

S109: the first DAC circuit 152 converts the decoded digital feedback signal into a corresponding analog signal, and outputs the analog signal to the first reference generating circuit 153.

S110: the first reference generating circuit 153 generates a voltage reference signal according to the analog signal, and outputs the voltage reference signal to the first PFM/PWM control signal generating and driving module 12.

S111: the first PFM/PWM control signal generating and driving module 12 updates the preset reference voltage according to the voltage reference signal, and generates a PFM/PWM control signal according to the updated reference voltage to control the on/off time of the primary switch tube, further regulate the output voltage $V_{out}$ of the output end of the system.

Through the above steps S104~S111, a secondary regulation of the output voltage $V_{out}$ was achieved, by directly obtaining the actual output voltage of the system after the primary regulation and the demand voltage of the load on the secondary side, the voltage difference ΔV was obtained by comparing the actual output voltage of the system with the demand voltage, by regulating steps S104 to S111, the accuracy of the output voltage of the system was further effectively improved, and impact of errors in related devices in a system loop on the output voltage was eliminated, significantly improving a consistency of the system output.

Through the above steps S101 to S111, it can be obtained that the switching power supply system of the embodiment indirectly obtains the output voltage value of the secondary side by sampling the auxiliary winding on the primary side of the switching power supply system, by controlling the on/off time of the primary switch tube, adjusting the output voltage for a first time to make the output voltage approach the load demand voltage; directly obtaining the actual output voltage of the system on the secondary side of the switching power supply system, the voltage difference between the actual output voltage of the system and the load demand voltage is obtained, according to the voltage difference, the output voltage is regulated twice, improving an accuracy of the switching power supply system in regulating the output voltage and eliminating the impact of errors in related devices in the system loop on the output voltage, significantly improving the consistency of the system output.

The switching power supply system of the embodiment overcomes the problems of poor output voltage accuracy and slow response speed in traditional primary feedback, and eliminates a complex circuit required for regulating the phase and gain margin of the feedback network when adopting the secondary analog negative feedback power supply system, by combining the advantages of the analog feedback and the digital feedback, a dual feedback power supply system is formed, which improves the output accuracy and control accuracy of the switching power supply, at the same time, it reduces a complexity of circuit structure, in order to adapt to the future, providing a new research direction for the power systems with increasingly high output requirements.

For ease of understanding, the following is an explanation of the initial and secondary regulation of the output voltage in steps S101 to S111 combined with specific numerical values:

if the preset reference voltage is 5V, the demand voltage of the load is 5V, and the first primary feedback signal sampling circuit 111 samples the output voltage of 4.5V to the system, the primary regulation process are as follows:

the first primary feedback signal sampling circuit 111 samples the feedback voltage of the auxiliary winding on the primary side, and outputs the feedback voltage to the first sampling signal processing circuit 112, the feedback voltage can be a voltage waveform of the sampled auxiliary winding;

the first sampling signal processing circuit 112 extracts the feedback signal with the current system output voltage of 4.5V from the voltage waveform of the auxiliary winding;

the first PFM/PWM control signal generating and driving module 12 amplifies and processes the error between the current system output voltage of 4.5V feedback signal and the preset reference voltage of 5V to obtain the feedback error signal, the feedback error signal indicates that the output voltage of the system is low, the first PFM/PWM control signal generating and driving module 12 controls the on/off time of the switch tube according to the feedback error signal to regulate the output voltage $V_{out}$ of the output end of the system, so that the output voltage $V_{out}$ value approaches the preset reference voltage, that is, the output voltage $V_{out}$ value approaches 5V.

After the primary regulation of the output voltage through the above process, the output voltage of the system is only regulated to 4.8V due to the errors of the reference voltage and peripheral devices on the system loop, the secondary regulation process are as follows:

the first ADC circuit 131 directly obtains the actual output voltage of the secondary side of the system as 4.8V, and converts the signal of the system output voltage of 4.8V into the corresponding digital signal to output to the first digital processing and reference controlling logic circuit 132;

the first digital processing and reference controlling logic circuit 132 obtains the actual output voltage of the current system of 4.8V according to the digital signal output by the first ADC circuit 131, after comparing the actual output voltage of the system of 4.8V with the required voltage of the load of 5V, the voltage difference ΔV is obtained as 0.2V, the voltage difference ΔV is output to the first digital feedback signal generating circuit 133;

the first digital feedback signal generating circuit 133 generates the digital feedback signal according to the signal with the voltage difference of 0.2V, and outputs the digital feedback signal to the first digital feedback signal driving circuit 134;

the first digital feedback signal driving circuit 134 drives the first isolation transmission module 14 according to the received digital feedback signal, and transmits the digital feedback signal to the first secondary digital feedback signal decoding and logic controlling circuit 151;

the first secondary digital feedback signal decoding and logic controlling circuit 151 decodes the received digital feedback signal to obtain the voltage difference ΔV of 0.2V, and outputs the signal with the voltage difference ΔV of 0.2V to the first DAC circuit 152;

the first DAC circuit 152 converts the received signal with the voltage difference ΔV of 0.2V into the corresponding analog signal, and outputs the corresponding analog signal to the first reference generating circuit 153;

the first reference generating circuit 153 generates the corresponding voltage reference signal according to the received analog signal, and outputs the voltage reference signal to the first PFM/PWM control signal generating and driving module 12, the voltage reference signal increases the preset reference voltage by 0.2V;

the first PFM/PWM control signal generating and driving module 12 is configured to update the preset reference voltage according to the voltage reference signal, that is, increasing the preset reference voltage by 0.2V, the first PFM/PWM control signal generating and driving module 12 can determine a need to increase the output voltage $V_{out}$ according to the voltage reference signal, therefore, the first PFM/PWM control signal generating and driving module 12 generates the corresponding PFM/PWM control signal to control the on/off time of the primary switch tube, and further regulate the output voltage $V_{out}$ of the system to the actual load demand voltage of 5V, the control signal can indicate that the output voltage of the system is low and needs to be increased.

Figure 2:
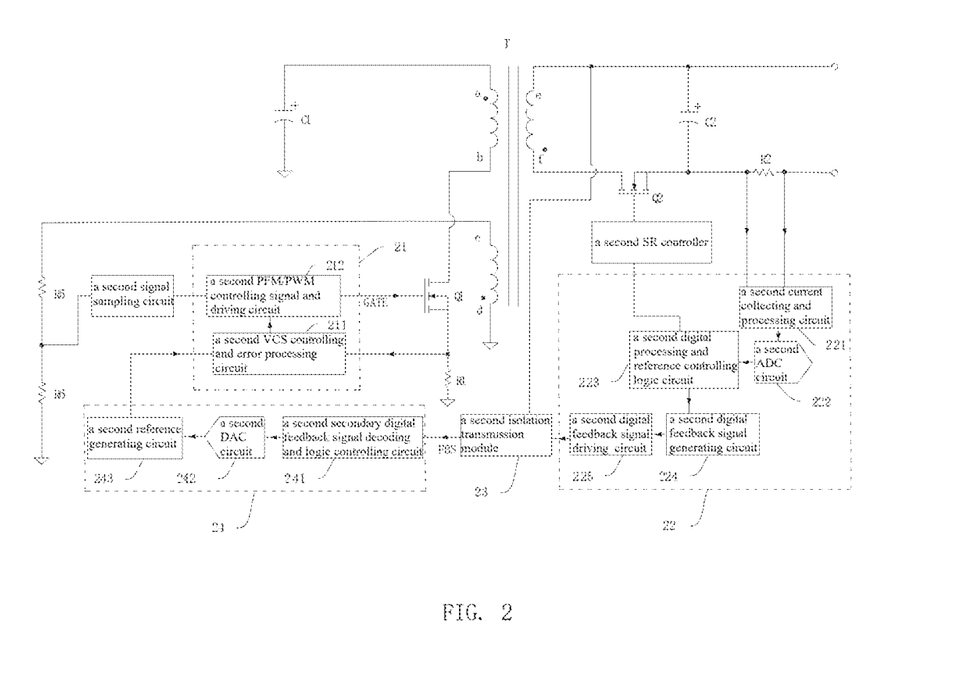
FIG. 2 is a circuit diagram of an output current regulation of switching power supply system in embodiment 2 according to the present application.

Embodiment 2: referring to FIG. 2, which is the circuit diagram for regulating the output current of the switching power supply system in the embodiment, the digital feedback signal transmission method of the embodiment is to transmit the feedback signal from the secondary side of the switching power supply system to the primary side of the switching power supply system through a second isolation transmission module 23.

The switching power supply system of the embodiment includes the transformer T, with one side of the transformer T port a, port b, port c, and port d being the primary side of the transformer, that is the primary side of the switching power supply system, one side of the transformer T port e and port f is the secondary side of the transformer, that is the secondary side of the switching power supply system, the port a is connected to the capacitance C1, the positive electrode of the capacitance C1 is connected to the port a, and the negative electrode of the capacitance C1 is grounded, the capacitance C1 is configured to filter the power supply of the input system; there is the capacitance C2 connected between the port e and the port f of the transformer T, the positive electrode of capacitance C2 is connected to the port e, the negative electrode of the capacitance C2 is connected to the port f, and capacitance C2 is configured to filter the voltage output from the system to the load.

The switching power supply system of the embodiment includes a second analog collecting and regulating module 21, a second secondary digital feedback signal sampling and driving module 22, a second isolation transmission module 23, a second secondary digital feedback signal decoding and reference generating module 24.

Further, the second analog collecting and regulating module 21 includes a second VCS controlling and error processing circuit 211 and a second PFM/PWM control signal and driving circuit 212, in the embodiment, the primary switch tube is MOS tube Q1, the drain electrode of the MOS tube Q1 is connected to the port b of the transformer T, the source electrode of the MOS tube Q1 is connected in series with the resistance R1 and then grounded, and the source electrode of the MOS tube Q1 is also connected to the second VCS controlling and error processing circuit 211, the gate electrode of the MOS tube Q1 is connected to the second PFM/PWM control signal and driving circuit 212.

The second secondary digital feedback signal sampling and driving module 22 includes a second current collecting and processing circuit 221, a second ADC circuit 222, a second digital processing and reference controlling logic circuit 223, a second digital feedback signal generating circuit 224, and a second digital feedback signal driving circuit 225, the synchronous rectification MOS tube Q2 is electrically coupled between the secondary winding of the transformer T and the resistance R2, and the drain electrode of the synchronous rectification MOS tube Q2 is connected to the port f of the transformer T, the source of the synchronous rectification MOS tube Q2 is connected to one end of the resistance R2, and the other end of the resistance R2 is connected to the load.

The second isolation transmission module 23 can adopt the optocoupler, the magnetic coupler, or the other digital isolators, the second isolation transmission module 23 is connected to the port e of the transformer T.

The second secondary digital feedback signal decoding and reference generating module 24 includes a second secondary digital feedback signal decoding and logic controlling circuit 241, a second DAC circuit 242, and a second reference generating circuit 243.

Combining with FIG. 1, the following is a detailed description of how the switching power supply system in the embodiment can regulate the output current with a high precision:

S201: the second VCS controlling and error processing circuit 211 collects a peak current on the primary side of the switching power supply, which determines the output current $I_{out}$ of the system, therefore, the second VCS controlling and error processing circuit 211 obtains the output current $I_{out}$ of the system, the second VCS controlling and error processing circuit 211 compares the output current $I_{out}$ with the preset reference current to generate the control signal, and outputs the control signal to the second PFM/PWM control signal and driving circuit 212.

S202: the second PFM/PWM control signal and driving circuit 212 controls the on/off time of the primary switch tube according to the control signal to regulate the output current $I_{out}$ of the output end of the system, so that the output current $I_{out}$ value approaches a preset maximum current $I_{max}$ value.

Optionally, a preset reference current value in the second VCS controlling and error processing circuit 211 is equal to the preset maximum current $I_{max}$ value.

Through the above steps S201 to S202, an primary regulation of the output current $I_{out}$ was achieved. However, due to the fact that the above steps, the output current value of the secondary side is indirectly obtained by collecting on the primary side of the switching power supply system, thereby the sampling accuracy is low and there may be errors, resulting in a difference between an actual output current of the system after a primary regulation and the preset maximum current. Therefore, regulating again through the following steps:

S203: the second current collecting and processing circuit 221 is connected to both ends of the resistance R2, and the second current collecting and processing circuit 221 directly obtains the output current signal of the system on the secondary side, and outputting the output current signal of the system to the second ADC circuit 222.

S204: the second ADC circuit 222 coverts the output current signal of the system into a corresponding digital signal, and outputs the digital signal to the second digital processing and reference controlling logic circuit 223.

S205: the second digital processing and reference controlling logic circuit 223 obtains the output current signal of the system according to the digital signal, compares and processes the output current signal of the system with the preset maximum current $I_{max}$ to obtain the current difference $\Delta I$, and outputs the current difference $\Delta I$ to the second digital feedback signal generating circuit 224.

S206: the second digital feedback signal generating circuit 224 generates the digital feedback signal according to the current difference $\Delta I$, and outputs the digital feedback signal to the second digital feedback signal driving circuit 225.

S207: the second digital feedback signal driving circuit 225 drives the second isolation transmission module 23 according to the digital feedback signal to transmit the digital feedback signal to the second secondary digital feedback signal decoding and logic controlling circuit 241.

S208: the second secondary digital feedback signal decoding and logic controlling circuit 241 receives the digital feedback signal transmitted by the second isolation transmission module 23, decodes the digital feedback signal, and outputs the decoded digital feedback signal to the second DAC circuit 242.

S209: the second DAC circuit 242 converts the decoded digital feedback signal into the corresponding analog signal, and outputs the analog signal to the second reference generating circuit 243.

S210: the second reference generating circuit 243 generates a current reference signal according to the analog signal and outputs the current reference signal to the second VCS controlling and error processing circuit 211.

S211: the second VCS controlling and error processing circuit 211 updates the preset reference current according to the current reference signal, generates a control signal according to an updated reference current, and outputs the control signal to the second PFM/PWM control signal and driving circuit 212.

S212: the second PFM/PWM control signal and driving circuit 212 controls the on/off time of the primary switch tube according to the control signal, further regulates the output current $I_{out}$ of the output end of the system.

Through the above steps S203 to S212, a secondary regulation of the output current $V_{out}$ was achieved, by directly obtaining the output current of the system after the primary regulation on the secondary side, the voltage difference ΔV was obtained by comparing the output current of the system with the preset maximum current, by regulating steps S203 to S212, the accuracy of the output current of the system was further effectively improved, and impact of errors in related devices in the system loop on the output current was eliminated, significantly improving a consistency of the system output.

Through the above steps S201 to S212, it can be obtained that the switching power supply system of the embodiment indirectly obtains the output current of the secondary side on the primary side of the switching power supply system, by controlling the on/off time of the primary switch tube, regulating the output current for the first time to make the output current approach the preset maximum current; directly obtaining the current output current of the system on the secondary side of the switching power supply system, the current difference between the current output current of the system and the preset maximum current is obtained, according to the current difference, the output current is regulated twice, improving a precision of the switching power supply system in regulating the output current and eliminating the impact of errors in related devices in the system loop on the output current, significantly improving the consistency of the system output.

The switching power supply system of the embodiment overcomes the problems of poor output current accuracy and slow response speed in traditional primary feedback, and eliminates a complex circuit required for regulating the phase and gain margin of the feedback network when adopting the secondary analog negative feedback power supply system, by combining the advantages of the analog feedback and the digital feedback, a dual feedback power supply system is formed, which improves the output accuracy and control accuracy of the switching power supply, at the same time, it reduces a complexity of circuit structure, in order to adapt to the future, providing a new research direction for the power systems with increasingly high output requirements.

For ease of understanding, the following is an explanation of the initial and secondary regulation of the output current in steps S201 to S212 combined with specific numerical values:

If the preset reference current is 3 A, the preset maximum current $I_{max}$ is 3 A, and the second VCS controlling and error processing circuit 211 obtains the output current $I_{out}$ of the system of 2.6 A according to a collected peak current, the primary regulation process is as follows:

the second VCS controlling and error processing circuit 211 obtains the output current of the system of 2.6 A by collecting the peak current on the primary side of the switching power supply, the output current of 2.6 A is compared with the preset reference current 3 A to generate the control signal, the control signal is output to the second PFM/PWM control signal and driving circuit 212, the control signal can indicate that the output current of the system is low.

The second PFM/PWM control signal and driving circuit 212 controls the on/off time of the primary switch tube according to the control signal, increasing the output current of the system output end and approaching the preset maximum current 3 A.

After the primary regulation of the output current through the above process, the actual output current of the system is only regulated to 2.8 A due to the errors of the reference current and peripheral devices on the system loop, the secondary regulation process is as follows:

the second current collecting and processing circuit 221 directly obtains the actual output current of the system on the secondary side as 2.8 A, and outputs the actual output current of the system as 2.8 A to the second ADC circuit 222;

the second ADC circuit 222 converts the received system actual output current of 2.8 A into the corresponding digital signal, and outputs the digital signal to the second digital processing and reference controlling logic circuit 223;

the second digital processing and reference controlling logic circuit 223 compares the received system actual output current of 2.8 A with the preset maximum current of 3 A to obtain the current difference ΔI of 0.2 A, the current difference ΔI is output to the second digital feedback signal generating circuit 224;

the second digital feedback signal generating circuit 224 generates the digital feedback signal according to the current difference ΔI of 0.2 A, and outputs the digital feedback signal to the second digital feedback signal driving circuit 225;

the second digital feedback signal driving circuit 225 drives the second isolation transmission module 23 according to the received digital feedback signal, and transmits the digital feedback signal to the second secondary digital feedback signal decoding and logic controlling circuit 241;

the second secondary digital feedback signal decoding and logic controlling circuit 241 decodes the received digital feedback signal to obtain the current difference ΔI of 0.2 A, and outputs the signal with the current difference ΔI of 0.2 A to the second DAC circuit 242;

the second DAC circuit 242 converts the received signal with the current difference ΔI of 0.2 A into the corresponding analog signal, and outputs the corresponding analog signal to the second reference generating circuit 243;

the second reference generating circuit 243 generates the corresponding current reference signal according to the received analog signal, and outputs the current reference signal to the second VCS controlling and error processing circuit 211, the current reference signal can increase the current reference value by 0.2 A;

the second VCS controlling and error processing circuit 211 updates the preset reference current according to the current reference signal output by the second reference generating circuit 243, which increases the reference current by 0.2 A, according to the current reference signal, the second VCS controlling and error processing circuit 211 can determine the need to increase the output current $I_{out}$. therefore, the second VCS controlling and error processing circuit 211 generates the corresponding control signal, and outputs the control signal to the second PFM/PWM control signal and driving circuit 212, the control signal can indicate that the system output current is low and needs to be increased;

the second PFM/PWM control signal and driving circuit 212 controls the on/off time of the primary switch tube according to the control signal, and further regulates the output current $I_{out}$ of the system output end to the maximum current value 3 A.

Figure 3:
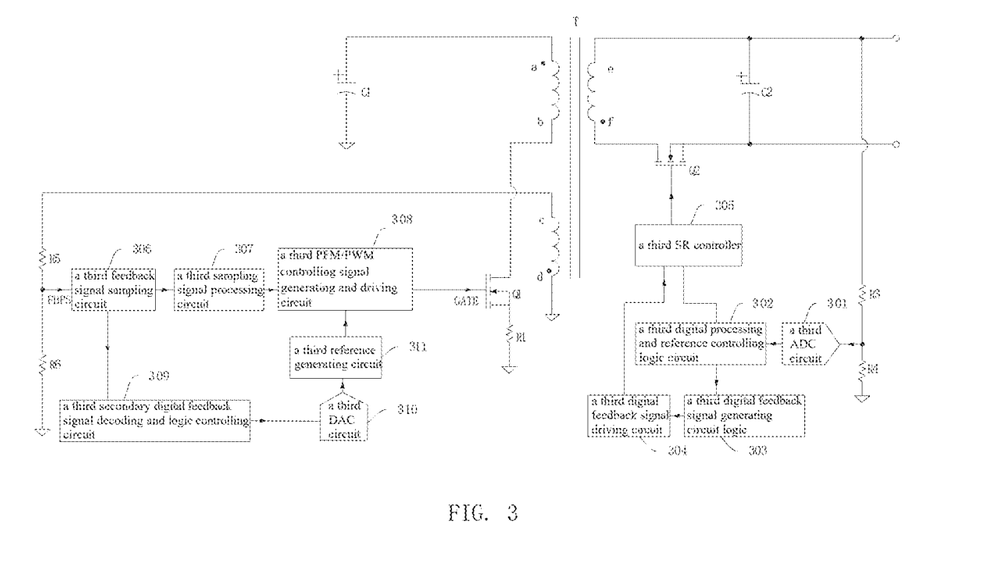
FIG. 3 is a circuit diagram of the output voltage regulation of switching power supply system in embodiment 3 according to the present application.

Embodiment 3: referring to FIG. 3, it is a circuit diagram for regulating an output voltage of a switching power supply system in the embodiment, the digital feedback signal transmission method of the embodiment is to control an on-off of a synchronous rectification MOS tube through a third SR controller 305, and transmit the feedback signal from the secondary side of the switching power supply system to the primary side of the switching power supply system through the transformer T, the digital feedback signal transmission method in the embodiment replaces a role of the first isolation transmission module 14 in embodiment 1.

The switching power supply system of the embodiment includes a transformer T, a capacitance C1, and a capacitance C2, the transformer T includes ports a, b, c, d, e, and f, the ports of the transformer T and a connection method of the capacitance C1 and the capacitance C2 are described in embodiment 1 and will not be repeated herein.

The switching power supply system of the embodiment includes a third ADC circuit 301, a third digital processing and reference controlling logic circuit 302, a third digital feedback signal generating circuit 303, a third digital feedback signal driving circuit 304, a third SR controller 305, a third feedback signal sampling circuit 306, a third sampling signal processing circuit 307, a third PFM/PWM control signal generating and driving circuit 308, a third secondary digital feedback signal decoding and logic controlling circuit 309, a third DAC circuit 310, and a third reference generating circuit 311.

In the embodiment, the primary switch tube is MOS tube Q1, a drain electrode of the MOS tube Q1 is connected to the port b of the transformer T, a source electrode of the MOS tube Q1 is connected in series with a resistance R1 and then grounded, a gate of the MOS tube Q1 is connected to the third PFM/PWM control signal generating and driving circuit 308.

The port e of the transformer T is connected in series with a resistance R3 and a resistance R4 in sequence and then grounded, the third ADC circuit 301 is connected to an ungrounded end of the resistance R4, and the synchronous rectification MOS tube Q2 is electrically coupled between a secondary winding of the transformer T and the load, a drain electrode of the synchronous rectification MOS tube Q2 is connected to the port f of the transformer T, a source electrode of the synchronous rectification MOS tube Q2 is connected to the load, and a gate electrode of the synchronous rectification MOS tube Q2 is connected to the third SR controller 305.

The port c of the transformer T is connected in series with a resistance R5 and a resistance R6, and then grounded, the third feedback signal sampling circuit 306 is connected to an ungrounded end of the resistance R6.

Combining with FIG. 3, the following is a detailed description of how the switching power supply system in the embodiment can regulate the output voltage with a high precision:

S301: the third feedback signal sampling circuit 306 samples the feedback voltage of the auxiliary winding on the primary side and outputs the feedback voltage to the third sampling signal processing circuit 307.

S302: the third sampling signal processing circuit 307 generates a corresponding feedback signal after processing the current feedback voltage, and outputs the feedback signal to the third PFM/PWM control signal generating and driving circuit 308.

S303: the third PFM/PWM control signal generating and driving circuit 308 amplifies and processes an error between the feedback signal and a preset reference voltage to obtain a feedback error signal, and generates a PFM/PWM control signal according to the feedback error signal to control an on/off time of the MOS tube Q1, to regulate the output voltage $V_{out}$ of an output end of the system, so that the output voltage $V_{out}$ value approaches a demand voltage $V_{req}$ value of the load.

The PFM/PWM control signal generated by the above third PFM/PWM control signal generating and driving circuit 308 can be either a pulse width modulation signal or a pulse frequency modulation signal.

Through the above steps S301 to S303, an primary regulation of the output voltage $V_{out}$ was achieved. However, due to the fact that the above steps indirectly obtain the output voltage value of the secondary side by sampling the auxiliary winding on the primary side of the switching power supply system, thereby the sampling accuracy is low and there may be errors, resulting in a difference between an actual output voltage of the system after a primary regulation and the voltage required by the load. Therefore, regulating again through the following steps:

S304: the third ADC circuit 301 directly obtains the actual output voltage of the secondary side of the system, and converts the current actual output voltage of the system into a corresponding digital signal before outputting it to the third digital processing and reference controlling logic circuit 302.

S305: third digital processing and reference controlling logic circuit 302 obtains the actual output voltage of the current system according to the digital signal, and compares the actual output voltage of the current system with the required voltage $V_{req}$ of the load to obtain the voltage difference $\Delta V$ after processing, the voltage difference $\Delta V$ is output to the third digital feedback signal generating circuit 303.

S306: the third digital feedback signal generating circuit 303 generates the digital feedback signal according to the voltage difference $\Delta V$, and outputs the digital feedback signal to the third digital feedback signal driving circuit 304.

S307: the third digital feedback signal driving circuit 304 drives the third SR controller 305 according to the digital feedback signal, making the third SR controller 305 control the on/off of the synchronous rectification MOS tube Q2, a switch voltage waveform is configured as a carrier, the digital feedback signal is modulated onto the switch voltage waveform to generate a modulation signal.

S308: the auxiliary winding obtains the modulated switch voltage waveform of a secondary winding through coupling, the third feedback signal sampling circuit 306 samples the modulated signal to generate a sampling signal, which is output to the third secondary digital feedback signal decoding and logic controlling circuit 309.

S309: the third secondary digital feedback signal decoding and logic controlling circuit 309 decodes the sampling signal and outputs the decoded digital feedback signal to the third DAC circuit 310.

S310: the third DAC circuit 310 converts the decoded digital feedback signal into the corresponding analog signal, and outputs the analog signal to the third reference generating circuit 311.

S311: the third reference generating circuit 311 generates the voltage reference signal according to the analog signal, and outputs the voltage reference signal to the third PFM/PWM control signal generating and driving circuit 308.

S312: the third PFM/PWM control signal generating and driving circuit 308 updates the preset reference voltage according to the voltage reference signal, and generates the PFM/PWM control signal according to the updated reference voltage to control the on/off time of the primary switch tube, further regulates the output voltage $V_{out}$ of the system output end.

Through the above steps S304 to S312, a secondary regulation of the output voltage $V_{out}$ was achieved, by directly obtaining the actual output voltage of the system after the primary regulation and the demand voltage of the load on the secondary side, the voltage difference $\Delta V$ was obtained by comparing the actual output voltage of the system with the demand voltage of the load, by regulating steps S304 to S312, the accuracy of the output voltage of the system was further effectively improved, and impact of errors in related devices in a system loop on the output voltage was eliminated, significantly improving a consistency of the system output.

Through the above steps S301 to S312, it can be obtained that the switching power supply system of the embodiment indirectly obtains the output voltage of the secondary side by sampling the auxiliary winding on the primary side of the switching power supply system, by controlling the on/off time of the primary switch tube, regulating the output voltage for a first time to make the output voltage approach the load demand voltage; directly obtaining the actual output voltage of the system on the secondary side of the switching power supply system, the voltage difference between the actual output voltage of the system and the load demand voltage is obtained, according to the voltage difference, the output voltage is regulated twice, improving a precision of the switching power supply system in regulating the output voltage and eliminating the impact of errors in related devices in the system loop on the output voltage, significantly improving the consistency of the system output.

A detailed information or signal transmission between each module in the embodiment can be referred to in embodiment 1, and will not be repeated herein.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A switching power supply system with both analog and digital feedback, wherein the switching power supply system is configured to regulate an output voltage $V_{out}$, comprising: a first primary analog feedback signal sampling and processing module, a first pulse-frequency modulation/pulse-width modulation (PFM/PWM) control signal generating and driving module, a first secondary digital feedback signal sampling and driving module, a first isolation transmission module, and a first secondary digital feedback signal decoding and reference generating module;

the first primary analog feedback signal sampling and processing module is configured to sample a feedback voltage of an auxiliary winding on a primary side, generate a corresponding feedback signal after processing a current feedback voltage, and output the corresponding feedback signal to the first PFM/PWM control signal generating and driving module;

the first PFM/PWM control signal generating and driving module is configured to control an on/off time of a primary switch tube according to the corresponding feedback signal, and regulate the output voltage $V_{out}$, so that a value of the output voltage $V_{out}$ approaches a demand voltage $V_{req}$ value of a load;

the first secondary digital feedback signal sampling and driving module is configured to directly obtain an actual output voltage of the switching power supply system on a secondary side, generate a secondary digital feedback signal after processing the actual output voltage, and transmit the secondary digital feedback signal to the first secondary digital feedback signal decoding and reference generating module through the first isolation transmission module;

the first secondary digital feedback signal decoding and reference generating module is configured to generate a corresponding voltage reference signal according to the secondary digital feedback signal, and output the corresponding voltage reference signal to the first PFM/PWM control signal generating and driving module;

the first PFM/PWM control signal generating and driving module is further configured to control the on/off time of the primary switch tube according to the corresponding voltage reference signal, and further regulate the output voltage $V_{out}$;

the first secondary digital feedback signal sampling and driving module comprises a first analog-to-digital converter (ADC) circuit, a first digital processing and reference controlling logic circuit, a first digital feedback signal generating circuit, and a first digital feedback signal driving circuit;

the first ADC circuit is configured to directly obtain the actual output voltage of the switching power supply system on the secondary side, and convert the actual output voltage into a corresponding digital signal and output the corresponding digital signal to the first digital processing and reference controlling logic circuit;

the first digital processing and reference controlling logic circuit is configured to obtain the actual output voltage according to the corresponding digital signal, comparing the actual output voltage with the demand voltage $V_{req}$ value of the load, and obtain a voltage difference $\Delta V$ after processing, the voltage difference $\Delta V$ is output to the first digital feedback signal generating circuit;

the first digital feedback signal generating circuit is configured to generate a digital feedback signal according to the voltage difference ΔV, and output the digital feedback signal to the first digital feedback signal driving circuit; and the first digital feedback signal driving circuit is configured to drive the first isolation transmission module according to the digital feedback signal, and transmit the secondary digital feedback signal to the first secondary digital feedback signal decoding and reference generating module.

2. The switching power supply system according to claim 1, wherein the first primary analog feedback signal sampling and processing module comprises a first primary feedback signal sampling circuit and a first sampling signal processing circuit;

the first primary feedback signal sampling circuit configured for sampling the feedback voltage of the auxiliary winding on the primary side, and outputting the feedback voltage to the first sampling signal processing circuit; and the first sampling signal processing circuit configured for generating the corresponding feedback signal after processing the current feedback voltage, and outputting the corresponding feedback signal to the first PFM/PWM control signal generating and driving module.

3. The switching power supply system according to claim 1, wherein:

the first PFM/PWM control signal generating and driving module is configured to amplify and process an error between the corresponding feedback signal output by the first primary analog feedback signal sampling and processing module and a preset reference voltage to obtain a feedback error signal, and according to the feedback error signal, generate a PFM/PWM control signal to control the on/off time of the primary switch tube and regulate the output voltage $V_{out}$, so that the value of the output voltage $V_{out}$ approaches the demand voltage $V_{req}$ value of the load; and the first PFM/PWM control signal generating and driving module is configured to update the preset reference voltage according to the corresponding voltage reference signal output by the first secondary digital feedback signal decoding and reference generating module, generate a second PFM/PWM control signal according to an updated reference voltage to control the on/off time of the primary switch tube, and further regulate the output voltage $V_{out}$.

4. The switching power supply system according to claim 1, wherein the first secondary digital feedback signal decoding and reference generating module comprises a first secondary digital feedback signal decoding and logic controlling circuit, a first digital-to-analog converter (DAC) circuit, and a first reference generating circuit;

the first secondary digital feedback signal decoding and logic controlling circuit is configured to receive the secondary digital feedback signal transmitted by the first isolation transmission module, decode the secondary digital feedback signal to yield a decoded digital feedback signal, and output the decoded digital feedback signal to the first DAC circuit;

the first DAC circuit is configured to convert the decoded digital feedback signal into a corresponding analog signal, and output the corresponding analog signal to the first reference generating circuit; and the first reference generating circuit is configured to generate the corresponding voltage reference signal according to the corresponding analog signal and output the corresponding voltage reference signal to the first PFM/PWM control signal generating and driving module.

5. The switching power supply system according to claim 1, wherein the first isolation transmission module is one of optocouplers or magnetic couplers.

6. A switching power supply system with both analog and digital feedback, the switching power supply system is configured to regulate an output current $I_{out}$, wherein the switching power supply system comprises: a second analog collecting and regulating module, a second secondary digital feedback signal sampling and driving module, a second isolation transmission module, and a second secondary digital feedback signal decoding and reference generating module;

the second analog collecting and regulating module is configured to collect a peak current on a primary side, determine the output current $I_{out}$ of the switching power supply system according to the peak current, control an on/off time of a primary switch tube according to the output current $I_{out}$, regulate the output current $I_{out}$ and make a value of the output current $I_{out}$ approach a preset maximum current $I_{max}$ value;

the second secondary digital feedback signal sampling and driving module is configured to directly obtain a system output current signal on a secondary side, and generate a secondary digital feedback signal after processing according to the system output current signal and the preset maximum current $I_{max}$ value, the secondary digital feedback signal is transmitted to the second secondary digital feedback signal decoding and reference generating module through the second isolation transmission module;

the second secondary digital feedback signal decoding and reference generating module is configured to generate a corresponding current reference signal according to the secondary digital feedback signal, and output the corresponding current reference signal to the second analog collecting and regulating module;

the second analog collecting and regulating module is further configured to update a preset reference current according to the corresponding current reference signal to yield an updated reference current, control the on/off time of the primary switch tube according to the updated reference current, and further regulate the output current $I_{out}$;

a value of the preset reference current is equal to the preset maximum current $I_{max}$ value, the second secondary digital feedback signal sampling and driving module comprises a second current collecting and processing circuit, a second analog-to-digital converter (ADC) circuit, a second digital processing and reference controlling logic circuit, a second digital feedback signal generating circuit, and a second digital feedback signal driving circuit;

the second current collecting and processing circuit is configured to directly obtain the system output current signal on the secondary side, and output the system output current signal to the second ADC circuit;

the second ADC circuit is configured to convert the system output current signal into a corresponding digital signal, and output the corresponding digital signal to the second digital processing and reference controlling logic circuit;

the second digital processing and reference controlling logic circuit is configured to obtain the system output current signal according to the corresponding digital signal, compare the system output current signal with the preset maximum current $I_{max}$ value, and obtain a current difference ΔI after processing, and output the current difference ΔI to the second digital feedback signal generating circuit;

the second digital feedback signal generating circuit is configured to generate the secondary digital feedback signal according to the current difference ΔI, and output the secondary digital feedback signal to the second digital feedback signal driving circuit; and the second digital feedback signal driving circuit is configured to drive the second isolation transmission module according to the secondary digital feedback signal, and transmit the secondary digital feedback signal to the second secondary digital feedback signal decoding and reference generating module.

7. The switching power supply system according to claim 6, wherein the second analog collecting and regulating module comprises a second voltage controlled source (VCS) controlling and error processing circuit and a second pulse-frequency modulation/pulse-width modulation (PFM/PWM) control signal and driving circuit;

the second VCS controlling and error processing circuit is configured to collect the peak current on the primary side, determine the output current $I_{out}$ of the switching power supply system according to the peak current, compare the output current $I_{out}$ with the preset reference current to generate a control signal, and output the control signal to the second PFM/PWM control signal and driving circuit;

the second PFM/PWM control signal and driving circuit is configured to control the on/off time of the primary switch tube according to the control signal to regulate the output current $I_{out}$, so that the value of the output current $I_{out}$ approaches the preset maximum current $I_{max}$ value; and the second VCS controlling and error processing circuit is further configured to receive the corresponding current reference signal output by the second secondary digital feedback signal decoding and reference generating module, update the preset reference current according to the corresponding current reference signal, generate the control signal according to the updated reference current, and output the control signal to the second PFM/PWM control signal and driving circuit.

8. The switching power supply system according to claim 6, wherein the second secondary digital feedback signal decoding and reference generating module comprises a second secondary digital feedback signal decoding and logic controlling circuit, a second digital-to-analog converter (DAC) circuit, and a second reference generating circuit;

the second secondary digital feedback signal decoding and logic controlling circuit is configured to receive the secondary digital feedback signal transmitted by the second isolation transmission module to yield a decoded digital feedback signal, decode the secondary digital feedback signal, and output the decoded digital feedback signal to the second DAC circuit;

the second DAC circuit is configured to convert the decoded digital feedback signal into a corresponding analog signal, and output the corresponding analog signal to the second reference generating circuit; and the second reference generating circuit is configured to generate the corresponding current reference signal according to the corresponding analog signal, and output the corresponding current reference signal to the second analog collecting and regulating module.

9. The switching power supply system according to claim 6, wherein the second isolation transmission module is one of optocouplers or magnetic couplers.

* * * * *